(12) United States Patent
Taylor

(10) Patent No.: US 6,270,537 B1
(45) Date of Patent: Aug. 7, 2001

(54) FUEL COMPOSITION AND BLEND

(75) Inventor: Spencer Edwin Taylor, Camberley (GB)

(73) Assignee: BP Oil International Limited, London (GB)

( * ) Notice: Subject to any disclaimer, the term of this patent is extended or adjusted under 35 U.S.C. 154(b) by 0 days.

(21) Appl. No.: 09/567,275

(22) Filed: May 9, 2000

Related U.S. Application Data

(63) Continuation of application No. PCT/GB98/03418, filed on Nov. 13, 1998, and a continuation-in-part of application No. 09/176,900, filed on Oct. 22, 1998.

(30) Foreign Application Priority Data

| Nov. 13, 1997 | (GB) | 9723866 |
| Jul. 25, 1998 | (GB) | 9816165 |
| Nov. 6, 1998 | (WO) | PCT/GB98/03332 |

(51) Int. Cl.$^7$ ............................................. C10L 1/18
(52) U.S. Cl. .............................................. 44/385; 44/403
(58) Field of Search ........................... 44/385, 403

(56) References Cited

U.S. PATENT DOCUMENTS

| 4,098,708 | 7/1978 | Stuebe . |
| 4,617,336 | 10/1986 | Pastor et al. . |

FOREIGN PATENT DOCUMENTS

| 0 461 554 A1 | 12/1991 | (EP) . |
| 0 786 661 A2 | 7/1997 | (EP) . |
| 97/31698 | 9/1997 | (WO) . |

*Primary Examiner*—Margaret Medley
*Assistant Examiner*—Cephia D. Toomer
(74) *Attorney, Agent, or Firm*—Nixon & Vanderhye

(57) ABSTRACT

A jet fuel composition having reduced tendency to discoloration of high temperatures comprises a cyclic compound comprising m units of the formula 1a.

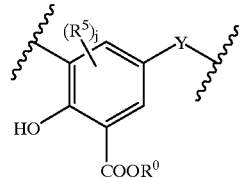

(Ia)

and n units of the formula (Ib)

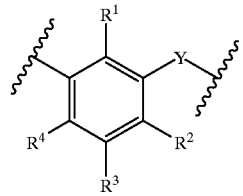

(Ib)

joined together to form a ring,
wherein Y is a divalent bridging group which may be the same or different in each unit;
$R^0$ is H or $(C_1–C_6)$ alkyl; $R^5$ is H or $(C_1–C_{60})$ alkyl; and j is 1 or 2;
$R^3$ is hydrogen, a hydrocarbyl or a hetero-substituted hydrocarbyl group; p1 each of $R^1$, $R^2$ and $R^4$, which may be the same or different, is hydroxyl, hydrogen, hydrocarbyl or hetero-substituted hydrocarbyl, with the proviso that at least one of $R^1$, $R^2$, $R^4$ is hydroxyl, and m+n is 4 to 20, m is 1–8 and n is at least 3 and preferably either $R^1$ is hydroxyl and $R^2$ and $R^4$ are independently either hydrogen, hydrocarbyl or hetero-substituted hydrocarbyl, or $R^2$ and $R^4$ are hydroxyl and $R^1$ is either hydrogen, hydrocarbyl or hetero-substituted hydrocarbyl; and m+n is from 4 to 20, m is from 1 to 8 and n is at least 3.

35 Claims, No Drawings

FUEL COMPOSITION AND BLEND

This is a continuation of PCT Application PCT/GB98/03418, filed Nov. 13, 1998, the entire contents of which is hereby incorporated by reference in this application, and is a continuation-in-part of Ser. No. 09/176,900, filed Oct. 22, 1998, pending.

The present invention concerns a fuel composition especially an aviation fuel composition, and a blend for use therein.

In high speed aircraft, both civilian and military, the liquid fuel is combusted to produce power, but also is circulated in the aircraft as a heat exchange fluid to remove the excess heat generated at such speeds e.g. in lubricating oils. The fuel is thus maintained for long periods at high temperatures, which results in discoloration and decomposition to produce soluble coloured products and insoluble products such as gums, sediments and granular material; insoluble products can form deposits that reduce the heat exchange capacity and can block filters potentially causing loss of power. Soluble coloured by-products are unsightly and an indication of some decomposition. The cause of discoloration etc. may be from phenols, naphthenates and sulphur compounds and/or metals which are often present in the fuels.

U.S. Pat. No. 5,478,367 describes the addition to diesel or jet fuel of a substituted unsaturated polyamine derivative dispersant to reduce particulate emissions on combustion and to reduce fouling i.e. deposition of insoluble deposits. The macrocyclic compounds preferably contain an N=C—N—C=O group and especially have fused rings, such as are made by reaction of a hydrocarbyl (e.g. fatty alkyl) succinic anhydride and a polyalkylene amnine.

Canadian Patent Publ. 2067907 describes the addition to distillate jet fuels of hydroxylamines to stabilise them against degradation at elevated temperatures.

U.S. Pat. No. 5,468,262 describes addition to jet fuels of thermal stability additives which are prepared by reacting a polyamine, aldehyde and phenol to form a condensate which is then reacted with a succinic anhydride containing a polyolefin derived unsaturated group. The additives are effective at 0.2% by weight.

EP-A-678568 describes addition to jet engine fuels of anti deposition agents which are derivatives of (thio) phosphonic acids.

There have now been discovered improved thermal stabilising additives for jet fuels which are oil soluble macromolecules comprising a hydroxy-carboxylic acid functionality.

Accordingly the present invention provides a jet fuel composition comprising a cyclic compound comprising m units of the formula 1a.

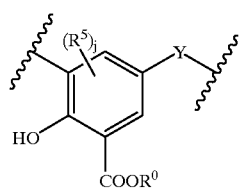

(Ia)

and n units of the formula (Ib)

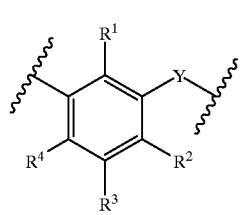

(Ib)

joined together to form a ring, wherein Y is a divalent bridging group which may be the same or different in each unit;

$R^0$ is H or ($C_1$–$C_6$) alkyl; $R^5$ is H or ($C_1$–$C_{60}$) alkyl; and j is 1 or 2;

$R^3$ is hydrogen, a hydrocarbyl or a hetero-substituted hydrocarbyl group; each of $R^1$, $R^2$ and $R^4$, which may be the same or different, is hydroxyl, hydrogen, hydrocarbyl or hetero-substituted hydrocarbyl, with the proviso that at least one of $R^1$, $R^2$, $R^4$ is hydroxyl, and m+n is 4 to 20, m is 1–8 and n is at least 3 and preferably either $R^1$ is hydroxyl and $R^2$ and $R^4$ are independently either hydrogen, hydrocarbyl or hetero-substituted hydrocarbyl, or $R^2$ and $R^4$ are hydroxyl and $R^1$ is either hydrogen, hydrocarbyl or hetero-substituted hydrocarbyl; and m+n is from 4 to 20, m is from 1 to 8 and n is at least 3. The cyclic compound is preferably a compound of the formula (I) with a ring structure.

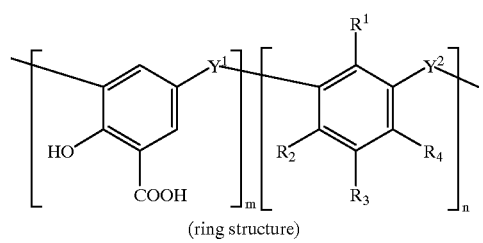

(I)

(ring structure)

wherein $Y^1$ and $Y^2$ are divalent bridging groups, which may be the same or different; $R^3$ is hydrogen, a hydrocarbyl or a hetero-substituted hydrocarbyl group; each of $R^1$, $R^2$ and $R^4$, which may be the same or different, is hydroxyl hydrogen, hydrocarbyl or hetero-substituted hydrocarbyl, with the proviso that at least one of $R^1$, $R^2$, $R^4$ is hydroxyl, and m+n is 4 to 20, m is 1–8 and n is at least 3.

When more than one salicylic acid unit is present in the ring (i.e. m>1), the salicylic acid and phenol units may be distributed randomly, although this does not exclude the possibility that in some rings there may be several salicylic acid units joined together in a row. Thus the m and n units may be joined in block and/or randomly.

In the formula I $Y^1$ and $Y^2$ may each independently be a hydrocarbyl bridging group or be a hetero-substituted hydrocarbyl group or up to 50% mole of the totality of $Y^1$ and $Y^2$ group may be a hetero atom. The hydrocarbyl bridging group is preferably aliphatic and has a chain of 1–4 carbon atoms; preferably the group is of formula $(CR^7R^8)_d$ e.g. $(CHR^8)d$ where each of $R^7$ and $R^8$, which may be the same or different, represents hydrogen or hydrocarbyl e.g. of 1–6 carbons, such as methyl or ethyl and d is an integer of 1–4 preferably 2 or especially 1; advantageously the group is of formula $(CHR^8)_d$ where $R^8$ is as defined above preferably methyl or especially hydrogen. $Y^1$ and/or $Y^2$ may also represent a hetero-substituted hydrocarbyl group with a hetero atom, e.g. O, S or NH interrupting a chain of carbon atoms e.g. 2–4 carbon atoms, such as in $CH_2OCH_2$, $CH_2SCH_2$ or $CH_2NHCH_2$. Up to 50 mole % of the totality of $Y^1$ and $Y^2$ groups may be a hetero atom e.g. O or NH or especially S, e.g. 1–50 mole % especially 8–20 mole % of said groups. Preferably $Y^1$ and $Y^2$ are hydrocarbyl groups, and the compound of formula I is sulphur free.

Each of $R^1$, $R^2$ and $R^4$ represents hydroxyl, hydrogen, hydrocarbyl or hetero-substituted hydrocarbyl with the proviso that at least one of $R^1$, $R^2$ and $R^4$ represents hydroxyl. Thus all three may represent hydroxyl as in a phloroglucinol derivative, or two as in a resorcinol derivative (i.e. the compound of formula I contains a resorcinarene group), or one as in a phenol derivative. Preferably either $R^1$ is hydroxyl and $R^2$ and $R^4$ are independently either hydrogen (which is preferred), hydrocarbyl or hetero-substituted hydrocarbyl, or $R^2$ and $R^4$ are hydroxyl and $R^1$ is either hydrogen, hydrocarbyl or hetero-substituted hydrocarbyl.

Regarding $R^1$ to $R^5$ and $R^8$, the term "hydrocarbyl" includes $(C_1-C_{60})$ alkyl such as t-butyl, t-amyl, s-butyl, isopropyl, octyl, nonyl, dodecyl and octadecyl. Alternatively the hydrocarbyl group may be derived from a polyolefin, for example polyethylene, polypropylene, polybutylene or a polyolefin copolymer, for example an ethylene/propylene copolymer, preferably derived from a polyisobutene. Alternatives include isoprene-butadiene, styrene-isoprene or styrene-butadiene block copolymers such as those disclosed in WO 96/40846, or ethylene-propylene and ethylene-butene-1 copolymers having molecular weights from 1500 to 2500 or 7500, as disclosed in U.S. Pat. No. 5,567,344 and U.S. Pat. No. 5,578,237. Mixtures of all the above may also be employed. Any hetero-substituted hydrocarbyl group has the heteroatom, preferably —O— or =NH, interrupting a chain of carbon atoms, such as an alkoxy-alkyl group of 2–20 carbons. Each of $R^1$–$R^5$ may otherwise be as described for $R^3$ below.

The hydrocarbyl group for $R^1$, $R^2$ or $R^4$ usually has 1–14 e.g. 1–6 carbons and is preferably saturated, especially an alkyl group e.g. methyl, ethyl, propyl, butyl or hexyl group. The hetero-substituted hydrocarbyl group has at least one e.g. 1–3 especially 1 hetero atom e.g. O, S or NH interrupting a chain of carbon atoms e.g. 2–20, or 2–6 carbons as in an alkoxy alkylene group such as ethoxy ethyl.

$R^3$ is hydrogen, hydrocarbyl or a hetero-substituted hydrocarbyl group. Preferably $R^3$ is hydrocarbyl or a hetero-substituted hydrocarbyl in at least $R^3$ group in the compound of formula 1, especially with n such groups in the molecule. The hydrocarbyl group may be alkyl, alkenyl, cycloalkyl, aryl, aralkyl and contains at least 1 especially at least 4 or at least 8 carbon atoms e.g. 4–40 carbons in particular with 8–20 carbons in a chain. Preferred are linear or branched alkyl e.g. of 8–24 or 8–20 carbons, such as decyl, dodecyl, tetradecyl, hexadecyl, octadecyl, lauryl, myristyl, stearyl, palmityl, propylene tetramer or alkenyl e.g. of 6–24 carbons such as oleyl, or cycloalkyl e.g. of 5–8 carbons such as cyclohexyl, aryl e.g. of 6–24 carbons such as phenyl, tolyl and alkylphenyl with 6–16 carbons in the alkyl e.g. dodecylphenyl and aralkyl e.g. of 7–26 carbons such as benzyl and alkyl substituted benzyl with 6–16 carbons in the alkyl e.g. dodecyl benzyl. $R^3$ may also represent a polymeric hydrocarbyl group e.g. from a polyolefin group, especially from one or more olefins of 2–6 carbons such as ethylene, propylene, butene, isobutene; the polymeric groups may be from polyethylene, polypropylene, polybutene, an ethylene propylene copolymer or polyiso butene (which is preferred). Molecular weights of polymeric $R^3$ groups may be 300–6000 e.g. 500–2000. In the compound of formula I, there may be different $R^3$ groups in the same molecule.

In the compound of formula I, m is from 1 to 8 e.g. 1–4 especially 2 or in particular 1, while n is at least 3 e.g. 3–10, in particular 5–9 especially 6–8. The sum of m+n is 4–20, preferably 5–10 in particular 7–9, e.g. 6 or 8, or a mixture of compounds with m+n having the value of 6 and 8. Preferably m is 1 and m+n is 5–10.

In preferred salixarenes Y, $Y^1$ or $Y^2$ is $CH_2$; $R^1$ is hydroxyl; $R^2$ and $R^4$ are independently either hydrogen, hydrocarbyl or hetero-substituted hydrocarbyl; $R^3$ is either hydrocarbyl or hetero-substituted hydrocarbyl; $R^0$ is H; $R^5$ is hydrogen or an alkyl group of 6 to 50 carbon atoms, preferably 4 to 40 carbon atoms, more preferably of 6 to 25 carbon atoms; j is 2 or preferably 1; and m+n has a value of at least 5, preferably at least 6, typically at least 8, where m is 1 or 2, preferably 1.

More preferably $R^2$ and $R^4$ are hydrogen; $R^3$ is hydrocarbyl, preferably alkyl of greater than 4, preferably greater than 9 carbon atoms; $R^5$ is hydrogen; and m+n is from 6 to 12; m is 1 or 2.

In preferred compounds, $R^2$ and $R^4$ are hydrogen, m is 1 or 2, n is 5, 6 or 7, m+n is 6 and/or 8, $R^1$ is hydroxyl, $R^3$ is alkyl of 8–20 carbons e.g. dodecyl or octadecyl, or poly-isobutenyl.

For convenience the compounds of formula I are herein referred to as "salixarenes".

For a review of calixarenes the reader is referred to 'Monographs in Supramolecular Chemistry' by C David Gutsche, Series Editor—J Fraser Stoddart, published by the Royal Society of Chemistry, 1989. Calixarenes having a substituent hydroxyl group or groups include homocalixarenes, oxacalixarenes, homooxacalixarenes and heterocalixarenes.

Salixarenes may be made by reacting together appropriate amounts of the optionally substituted salicylic acid (or carboxylic ester), an optionally substituted phenol, and a carbonyl compound which is preferably an aldehyde e.g. formaldehyde, or acetaldehyde, in the presence of a base and optionally a catalyst. The reaction may be performed in the presence of sulphur if the compound of formula I is to contain combined sulphur.

The salixarenes may be made by a process comprising reacting together in a solvent at 50 weight % dilution or greater, in the presence of a basic catalyst, compounds of the formulas (IIa) and (IIb)

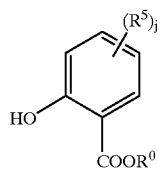

(IIa)

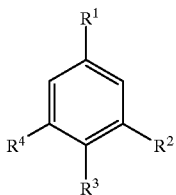

(IIb)

with an aldehyde of the formula O=CHR$^6$, and optionally sulphur; where R$^0$ to R$^6$ and j are as defined previously. By "50 weight % dilution" is meant that the solvent comprises at least 50% by weight of the reaction solution once all the reactants have been added. Preferably the solvent comprises at least 80% and more preferably at least 90% by weight of the reaction solution.

Preferred basic catalysts are alkali metal hydroxides such as sodium hydroxide, potassium hydroxide and lithium hydroxide. Sodium hydroxide is most preferred.

High dilution of the reaction mixture is necessary in order to ensure the formation of rings rather than linear molecules; at dilutions well below 50 weight % only linear molecules are formed. However even at high dilutions a proportion of the product may comprise linear molecules. Linear molecules are also composed of units having formulas (Ia) and (Ib) except that instead of the ends of the molecule being joined to form a ring, each end has a terminal group which is independently one of the following:

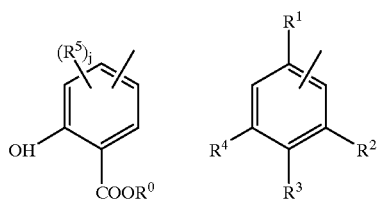

(III)

In the linear molecule the total number of units m+n is from 2 to 20, m is from 1 to 8 and n is at least 1. A further aspect of the invention provides the product of reacting compounds of the formulas (IIa) and (IIb) above with an aldehyde of the formula O=CH$^6$, and optionally sulphur; where R$^0$ to R$^6$ are as defined previously, which reaction product comprises at least 20% by weight of a cyclic compound comprising units of formulas (Ia) and (Ib) and no more than 80% of the linear version of said compound. Preferably the cyclic form comprises at least 40%, more preferably at least 60% and most preferably at least 80% by weight of the reaction product.

The jet fuel composition may also contain a non ring i.e. linear form of the compound of formula 1a/1b I, i.e. with structural units as shown in the Formulae I but terminated usually by the phenol and/or salicylic acid units.

The present invention also provides the use of at least one of these "salixarenes" to reduce the discoloration on heating of jet fuel compositions.

The preferred additive is dodecyl-salicylic calix[8]arene, which is a 1 Salix[8] arene comprising 7 dodecyl substituted phenolic units and one salicylic acid unit joined by methylene bridges, e.g. as present in the reaction product of compound A hereafter. Another preferred compound is a salixarene with 2 salicylic groups and 6 dodecylphenol units.

The additive may be present in the composition in amount of at least 1 at least 5ppm, such as 1–1000, 5–1000 e.g. 5–500 especially 5–200 or 10–100ppm based on the weight of the jet fuel composition. The additive may be mixed with the jet fuel composition in the form of a concentrate in solution, e.g. in an aliphatic aromatic hydrocarbon in 20–80% w/w solution, or it may be added as such to give a solution in the jet fuel. More than one of the salixarenes may be present e.g. 2–4, especially differing only in the values of at least one of m and n, especially n.

The composition comprises jet fuel. The jet fuel itself is a middle boiling distillate, usually kerosene which may be mixed with gasoline and optionally light petroleum distillate as in mixtures of gasoline and kerosene or light petroleum distillate, e.g. in weight amounts of 20–80:80–20 such as 50–75:50–25. The fuels for military use are designated JP4 to 8 e.g. JP4 as 65% gasoline/35% light petroleum distillate (according to U.S. Mil. Spec. (MIL 5624G)), JP5, similar to JP4 but of higher flash point, JP7, a high flash point special kerosene for advanced supersonic aircraft and JP8, a kerosene similar to Jet A1(according to MIL 83133C). Jet fuel for civilian use is usually a kerosene type fuel and designated Jet A or Jet A1. The jet fuel may have a boiling point of 66–343° C. or 66–316° C. (150–650° F. e.g. 150–600° F.), initial boiling point of 149–221° C., e.g. 204° C. (300–430° F., e.g. 400° F.), a 50% boiling point of 221–316° C. (430–600° F.) and a 90% boiling point of 260–343° C. (500–650° F.) and API Gravity of 30–40. Jet fuel for turbojet use may boil at 93–260° C. (200–500° F.) (ASTM D1655-59T). Further details on aviation fuels may be obtained from "Handbook of Aviation Fuel Properties", Coordinating Research Council Inc., CRC Report No. 530 (Society of Automotive Engineers Inc., Warrendale, PA, USA, 1983) and on US military fuels, from "Military Specification for Aviation Turbine Fuels", MIL-T-5624P.

The jet fuel may be the straight run kerosene optionally with added gasoline, but preferably has been purified to reduce its content of components contributing to or encouraging formation of coloured products and/or precipitates. Among such components are aromatics and olefins and mercaptans. Thus the fuels may be purified to reduce their mercaptan content e.g. Merox fuels and copper sweetened fuels or to reduce their sulphur content e.g. hydrofined fuels or Merifined fuels. Merox fuels are made by oxidation of the mercaptans and have a low mercaptan S content (e.g. less than 0.005% wt S) such as 0.0001–0.005% but a higher disulphide S content (e.g. at most 0.4% or at most 0.3% wt S such as 0.05–0.25 e.g. 0.1–2%); their aromatic (e.g. phenolics) and olefins content are hardly changed. Hydrofined jet fuels are ones in which the original fuel has been hydrogenated to remove at least some of sulphur compounds e.g. thiols and under severe conditions to saturate the aromatics and olefins; hydrofined jet filels have very low sulphur contents (e.g. less than 0.01% S by weight). Merifined fuels are fuels that have been extracted with an organic extractant to reduce or remove their contents of sulphur compounds and/or phenols. The jet fuel may also contain metals, either following contact with metal pipes or carried over from the crude oil; examples of such metals are copper, nickel, iron and chromium usually in amounts of less than I ppm e.g. each in 10–150 ppb amounts. Merox and hydrofined fuels are preferred and may be used in JP 4–8 jet fuels.

The jet fuel compositions of the invention contains the cyclic compound of formula 1a/1b or I and may also contain at least one conventional additive e.g. antioxidant, corrosion inhibitor, dispersant/detergent, (in particular in the case of hydroxy carboxylic acids (see below)), especially in amounts each of 1–1000ppm, 20–200ppm. The "salixarene" additives of formula I may be present in the composition especially with a dispersant; the dispersant is in particular one for solids known for use in fuels e.g. automotive or aviation fuels. Such dispersants usually have a polymeric carbon backbone with pendant groups containing nitrogen, which may be primary, secondary or tertiary, in cyclic or acyclic systems, and especially in amine, amide or imide groupings, in particular cyclic imide groups. The dispersants may also contain 1–5 polymer chains which are bridged by the nitrogen containing groups. Examples of such dispersants are the reaction products of polyisobutene succinic anhydride (PIBSA) and polyamines. Such dispersants are known compounds for dispersing particles of in non aqueous systems e.g. hydrocarbon systems. The weight ratio of "salixarene" to dispersant may be 99:1 to 10:90, especially 30:70 to 70:30. The additives and the fuel composition are preferably substantially ashless.

The fuel compositions of the invention containing the compounds of formula I, Ia, Ib, have an improved thermal stability as shown by a reduced tendency to discolour and/or produce solids on heating compared to the fuel alone (in the isothermal corrosion and oxidation test (ICOT based on ASTM D4871)). In some cases the combination of the compounds of formula I and certain other hydroxy carboxylic acid derivatives imparts to some fuels further improved stability still, better than either additive alone. This synergistic behaviour is found with combinations of the compound of formula I, Ia, Ib and the hydroxycarboxylic acid in Merox fuels.

Thus in a preferred embodiment the invention also provides a blend comprising at least one compound of formula I, Ia, Ib and at least one hydroxy carboxylic acid (different from said compound) with at least one chain of at least 8 carbon atoms. The invention also provides a jet fuel composition comprising said blend and a jet fuel which is a Merox fuel, especially one which has a mean deposit forming tendency in the ICOT test according to ASTM D4871 of 80–120mg deposit per litre of fuel, in particular 80–105mg/l.

In the blend of this invention the weight ratio of the compound (c) of formula I, Ia, Ib to hydroxycarboxylic acid is usually 10–90:90–1, in particular 30–85:70–15 and especially 35–65:65–35. The amount of the blend in the fuel is usually 10–1000ppm e.g. 30–200ppm.

The hydroxycarboxylic acid contains in total at least 1 hydroxyl group e.g. 1–4 such as 2 or 3 but preferably 1 hydroxyl group. It usually contains a hydroxyl group on a carbon atom alpha, beta or gamma to the carbon atom to which the carboxylic acid group is bonded and may optionally have 1 or more hydroxyl groups elsewhere in the molecule: preferably the only hydroxyl group in the molecule is in the alpha, beta or gamma especially the beta position. The hydroxy acid may be of formula,

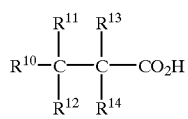

wherein one of $R^{11}$ and $R^{13}$ represents hydrocarbyl and the other hydrogen or an organic group, each of $R^{10}$, $R^{12}$ and $R^{14}$, which may be the same or different, represents hydrogen or an organic group, bonded via carbon or a heteroatom, which is O, N or S, with the proviso that at least one, and preferably only one of $R^{10}$–$R^{14}$ represents an organic group containing a carbon chain of at least 8 carbon atoms.

Examples of the organic groups, bonded via carbon are alkyl, cycloalkyl, alkenyl, aralkyl or aryl, e.g. as described for $R^3$ above, especially an alkyl group of 8–3000 carbons, in particular 8–24 carbons especially dodecyl, octadecyl, and 50–3000 carbons e.g. polyolefinyl such as from polyisobutene. Examples of the organic group bonded via nitrogen are amino groups with long chain hydrocarbyl group e.g. 8–24 carbons, or amido or imido groups from long chain carboxylic acids with 8–3000 carbons, e.g. 8–24 carbons such as fatty acids e.g. stearic and palmitic acids, or 50–3000 carbons e.g. polyolefinyl such as from a carboxylic derivative from polyisobutene such as PIBSA. In particular $R^{11}$ preferably represents hydroxyvor hydrogen, $R^{10}$ represents hydrogen or a long chain hydrocarbyl group of at least 8 carbons, especially 8–24 or 50–3000 carbons, $R^{12}$ represents hydrogen or alkyl of 1–6 carbons e.g. methyl or ethyl, $R^{13}$ represents hydroxyl or hydrogen and $R^{14}$ represents hydrogen or a amino, amido or imido group with a long chain aliphatic group or long chain mono or di acyl group, in particular a long chain succinic imide e.g. PIBSA. Especially $R^{10}$ or $R^{14}$ contains a long chain aliphatic group but not both. Preferred examples of the hydroxy carboxylic acid are N(long chain acyl) derivatives of beta hydroxy amino acids e.g. serine and threonine and long chain hydrocarbyl alpha hydroxy acids e.g. 1-hydroxy dodecanoic, 1-hydroxypalmitic and 1-hydroxystearic acids, 1-hydroxyl polyiso butenyl-1-carboxylic acid (from PIB aldehyde).

The invention will now be further illustrated by reference to the following Examples.

COMPOUNDS

A. Preparation of dodecyl-salicylic calixr[8]arene

A 5 litre flange flask was charged with the following ingredients:

234.5 g dodecylphenol (0.87 moles, 1 equiv)

17.25 g salicylic acid (0.125 moles, 0.152 equivs)

60 g paraformaldehyde (2.00 moles, 2.3 equivs)

52.5 g 10M sodium hydroxide (40% aqueous) (0.525 moles, 0.63 equiv)

2 kg xylene (solvent)

A reaction apparatus was then set up incorporating the 5L flange flask, a flange lid and clip, overhead stirrer with paddle and PTFE stirrer gland, Dean & Stark trap and double surface condenser. The reactor contents were heated by an electric mantle/thermocouple/Eurotherm temperature controller system. The glassware from just above the mantle to just below the condenser was lagged with glass wool.

The reaction mixture was rapidly heated to 90° C., and the temperature then further increased very slowly at a rate of approximately 1° C. every 10 minutes. Water (77ml) was collected over a period of 7 hours, at the end of which the temperature had reached 140° C. The mixture was then allowed to cool overnight before being refluxed (139° C.) for a further 2.5 hours. 100ml of the resultant brown solution was then separated, and the xylene solvent removed by rotary evaporator. The brown residue was then analysed by GPC which showed the presence of 26% of the 1:7 salicylic:dodecyl ring compound 25% of the 1:5 salicylic:docecyl ring compound and 24–40% of unreacted starting materials as the main components.

B. N(Polyisobutenyl Succinyl)serine

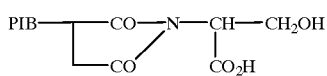

EXAMPLE 1–3 BLENDS

Blends of compounds A and B were made in 75:25, 50:50 and 25:75 weight proportions.

Jet Fuels
D. Merox
E. USAF POSF 3119 Merox
F. USAF POSF 2926 Merox
G. Merox
H. Hydrofined The fuels D-H have a mean deposit forming tendency in the ICOT test according to ASTM D4871 respectively of 99.4, 89.4, 74.3, 110.5 and 96 mg deposit litre of fuel.

ICOT Tests

This is basically as described in ASTM D4871. The test involves thermally treating 100ml of fuel (with and without additives, typically in batches of 4, including base fuel as a control) at 180° C. for 5 hours, whilst continuously passing air through the fuel at a constant flow rate of 150 ml min$^{-1}$. At the end of this test, the fuel is allowed to cool and "rest" for 24 hours before filtering and weighing to ±1 mg any deposits through pre-weighed 0.45 micron Millipore filters. Both filterable sediment and gum deposits are determined, the overall level of deposition being the sum of the two. The results are expressed as % ICOT efficiency being 100× [Difference in deposit weight of Control–that of sample]÷. Deposit wt of Control; the efficiency is thus a measure of how much reduction in deposits are achieved by use of the additives.

TABLE 1

| Fuel | Additive | ppm | ICOT % efficiency |
|---|---|---|---|
| D | B | 100 | 68 |
| D | A | 100 | 85 |
| D | A:B | 75:25 | 97 |
| D | A:B | 50:50 | 97 |
| D | A:B | 25:75 | 93 |

TABLE 2

| Fuel | Additive | ppm | ICOT % efficiency |
|---|---|---|---|
| E | B | 100 | (4) |
| E | A | 100 | 35 |
| E | A:B | 75:25 | 40 |
| E | A:B | 50:50 | 54 |
| E | A:B | 25:75 | 17 |

TABLE 3

| Fuel | Additive | ppm | ICOT % efficiency |
|---|---|---|---|
| F | B | 100 | (4) |
| F | A | 100 | 46 |
| F | A:B | 75:25 | 33 |
| F | A:B | 50:50 | 29 |
| F | A:B | 25:75 | 25 |

TABLE 4

| Fuel | Additive | ppm | ICOT % efficiency |
|---|---|---|---|
| G | B | 100 | 15 |
| G | A | 100 | 69 |

TABLE 5

| Fuel | Additive | ppm | ICOT % efficiency |
|---|---|---|---|
| H | B | 100 | 33 |
| H | A | 100 | 61 |
| H | A:B | 75:25 | 40 |
| H | A:B | 50:50 | 38 |

What is claimed is:

1. A fuel composition which comprises (a) a fuel selected from the group consisting of kerosene and a jet fuel and mixtures thereof and (b) a cyclic compound comprising m units of the formula (Ia)

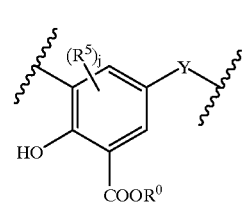

(Ia)

and n units of the formula (Ib)

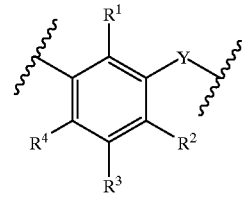

(Ib)

joined together to form a ring, wherein Y is a divalent bridging group which may be the same or different in each unit;

$R^0$ is selected from the group consisting of H and $C_1$–$C_6$ alkyl;

$R^5$ is selected from the group consisting of H and $C_1$–$C_{60}$ alkyl; j is 1 or 2;

$R^3$ is selected from the group consisting of hydrogen, a hydrocarbyl and a hetero-substituted hydrocarbyl group;

each of $R^1$, $R^2$ and $R^4$, which may be the same or different, is selected from the group consisting of hydroxyl, hydrogen, hydrocarbyl and hetero-substituted hydrocarbyl, with the proviso that at least one of $R^1$, $R^2$ and $R^4$ is hydroxyl, and m+n is 4 to 20, m is 1–8 and n is at least 3.

2. A composition according to claim 1, wherein the compound is a compound of the formula (I) with a ring structure

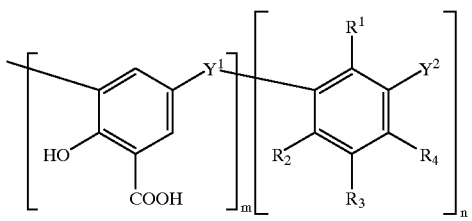

wherein $Y^1$ and Y2 are as defined for Y.

3. A composition according to claim 1 wherein $R^1$ is hydroxyl and $R^2$ and $R^4$ are independently selected from the group consisting of hydrogen, hydrocarbyl and hetero-substituted hydrocarbyl.

4. A composition according to claim 3 wherein $R^2$ and $R^4$ are hydroxyl and $R^1$ is selected from the group consisting of hydrogen, hydrocarbyl and hetero-substituted hydrocarbyl.

5. A composition according to claim 3 wherein $R^1$ is hydroxyl and $R^2$ and $R^4$ are hydrogen.

6. A composition according to claim 2 wherein $R^1$ is hydroxyl and $R^2$ and $R^4$ are independently selected from the group consisting of hydrogen, hydrocarbyl and hetero-substituted hydrocarbyl.

7. A composition according to claim 1 wherein Y is of formula $(CHR^8)_d$ wherein $R^8$ is selected from the group consisting of hydrocarbyl of 1–6 carbons and hydrogen, and d is an integer of 1–4.

8. A composition according to claim 1 wherein m is 1 and n is an integer of 5–10.

9. A composition according to claim 8 wherein in the said compound m+n has the value of 6 or 8, or the composition comprises a mixture of said compounds with m+n having the values of 6 and 8.

10. A composition according to claim 1 wherein $R^3$ is a hydrocarbyl group of at least 8 carbon atoms.

11. A composition according to claim 10 wherein $R^3$ is selected from the group consisting of an alkyl group of 8–20 carbons and a polymeric hydrocarbyl group from polyisobutene.

12. A composition according to claim 1 wherein $R^5$ is hydrogen, and $R^0$ is hydrogen.

13. A composition according to claim 2 wherein $Y^1$ and $Y^2$ are of formula $(CHR^8)_d$ wherein $R^8$ is selected from the group consisting of hydrocarbyl of 1–6 carbons and hydrogen and d is an integer of 1–4.

14. A composition according to claim 6 wherein $Y^1$ and $Y^2$ are of formula $(CHR^8)_d$ wherein $R^8$ is selected from the group consisting of hydrocarbyl of 1–6 carbons and hydrogen, and d is an integer of 1–4, m is 1 and n is an integer of 5–10 and $R^3$ is a hydrocarbyl group of at least 8 carbon atoms.

15. A composition according to claim 5 wherein Y is of formula $(CHR^8)_d$ wherein $R^8$ is selected from the group consisting of hydrocarbyl of 1–6 carbons and hydrogen, and d is an integer of 1–4, m is 1 and n is an integer of 5–10 and $R^3$ is a hydrocarbyl group of at least 8 carbon atoms.

16. A composition according to claim 15 wherein $R^5$ is hydrogen, and $R^0$ is hydrogen.

17. A composition according to claim 6 wherein Y, $Y^1$ and $Y^2$ are of formula $(CHR^8)_d$ wherein $R^8$ is selected from the group consisting of hydrocarbyl of 1–6 carbons and hydrogen, and d is an integer of 1–4, m is 1 and n is an integer of 5–10 and $R^3$ is a hydrocarbyl group of at least 8 carbon atoms.

18. A composition according to claim 17 wherein $R^5$ is hydrogen.

19. A composition according to claim 2 which is a jet fuel.

20. A composition according to claim 2 which is a jet fuel.

21. A composition according to claim 1 wherein the amount of cyclic compound is 5–1000 ppm (based on the weight of the composition).

22. A composition according to claim 2 wherein the amount of cyclic compound is 5–1000 ppm (based on the weight of the composition).

23. A composition according to claim 22 wherein the jet fuel is a Merox fuel.

24. A composition according to claim 20 wherein the jet fuel is a Merox fuel.

25. A composition according to claim 23 which also comprises a hydroxycarboxylic acid, different from said cyclic compound, and with at least one chain of at least 8 carbons.

26. A composition according to claim 24 which also comprises a hydroxycarboxylic acid, different from said cyclic compound, and with at least one chain of at least 8 carbons.

27. A composition according to claim 25 wherein the hydroxy carboxylic acid is a beta hydroxy carboxylic acid.

28. A composition according to claim 27 wherein the hydroxy carboxylic acid is an N-substituted serine.

29. A composition according to claim 28 wherein the hydroxy carboxylic acid is a N-(polyisobutenyl succinyl) serine.

30. A composition according to claim 26 wherein the hydroxy carboxylic acid is a N-(polyisobutenyl succinyl) serine.

31. A composition according to claim 25 wherein the cyclic compound and hydroxy carboxylic acid are present in a weight ratio of 30–85:70–15.

32. A blend for use in a fuel comprising kerosene or a jet fuel comprising a cyclic compound comprising m units of the formula Ia (Ia)

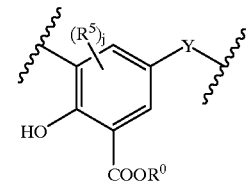

an n units of the formula (Ib)

(Ib)

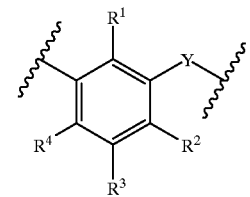

joined together to form a ring, wherein Y is a divalent bridging group which may be the same or different in each unit;

$R^0$ is selected from the group consisting of H and $(C_1-C_{60})$ alkyl; and j is 1 or 2;

$R^3$ is selected from the group consisting of hydrogen, a hydrocarbyl and a hetero-substituted hydrocarbyl group;

each of $R^1$, $R^2$ and $R^4$ which may be the same and different, is selected from the group consisting of hydroxyl, hydrogen, hydrocarbyl and hetero-substituted hydrocarbyl, with the proviso that at least one of $R^1$, $R^2$ and $R^4$ is hydroxyl, and m+n is 4 to 20, m is 1–8 and n is at least 3, and a hydroxycarboxylic acid, different from said cyclic compound and with at least one chain of at least 8 carbons.

33. A blend according to claim 32 wherein the cyclic compound is a compound of the formula (I) with a ring structure,

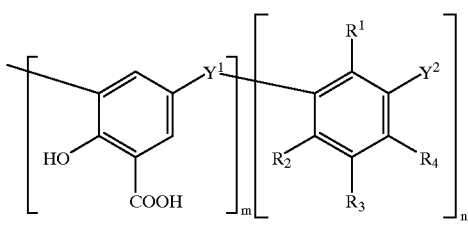

wherein $Y^1$ and Y2 are as defined for Y.

34. A method of thermally stabilizing a fuel which comprises a fuel selected from the group consisting of kerosene, a jet fuel and mixtures thereof, which comprises mixing with said fuel a cyclic compound comprising m units of the formula Ia

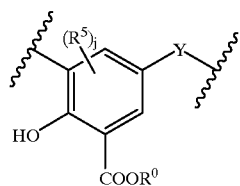

(Ia)

an n units of the formula (Ib)

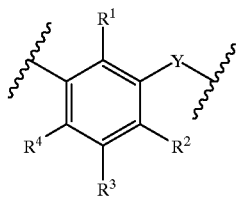

(Ib)

joined together to form a ring, wherein Y is a divalent bridging group which may be the same or different in each unit;

$R^0$ is selected from the group consisting of H and $(C_1-C_6)$ alkyl; $R^5$ is selected from the group consisting of H and $(C_1-C_{60})$ alkyl; and j is 1 or 2;

$R^3$ is selected from the group consisting of hydrogen, a hydrocarbyl and a hetero-substituted hydrocarbyl group;

each of $R^1$, $R^2$ and $R^4$ which may be the same and different, is selected from the group consisting of hydroxyl, hydrogen, hydrocarbyl and hetero-substituted hydrocarbyl, with the proviso that at least one of $R^1$, $R^2$ and $R^4$ is hydroxyl, and m+n is 4 to 20, m is 1–8 and n is at least 3, and a hydroxycarboxylic acid, different from said cyclic compound and with at least one chain of at least 8 carbons.

35. A method according to claim 34 wherein the compound is a compound of the formula (I) with a ring structure,

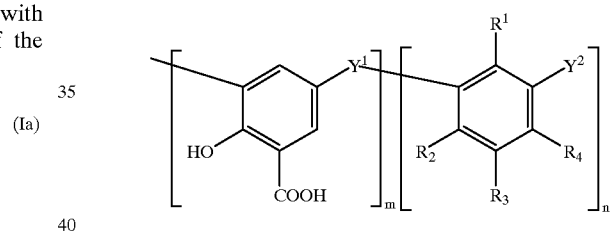

wherein $Y^1$ and $Y^2$ are as defined for Y, and the fuel is a jet fuel.

* * * * *